United States Patent
Vierra (10) Patent No.: US 10,389,752 B2
(45) Date of Patent: Aug. 20, 2019

(54) PRICE MINING PREVENTION SYSTEMS AND RELATED METHODS

(71) Applicant: Viesoft, Inc., San Francisco, CA (US)

(72) Inventor: Anthony Vierra, San Francisco, CA (US)

(73) Assignee: VIESOFT, INC., Walnut Creek, CA (US)

( * ) Notice: Subject to any disclaimer, the term of this patent is extended or adjusted under 35 U.S.C. 154(b) by 175 days.

(21) Appl. No.: 15/379,137

(22) Filed: Dec. 14, 2016

(65) Prior Publication Data

US 2017/0093909 A1 Mar. 30, 2017

Related U.S. Application Data

(63) Continuation-in-part of application No. 14/597,029, filed on Jan. 14, 2015, now Pat. No. 9,552,487.

(51) Int. Cl.
*H04L 29/06* (2006.01)
*G06F 21/36* (2013.01)
(Continued)

(52) U.S. Cl.
CPC ...... *H04L 63/1466* (2013.01); *G06F 16/2465* (2019.01); *G06F 16/951* (2019.01);
(Continued)

(58) Field of Classification Search
CPC ..... H04L 63/1466; H04L 63/10; G06F 21/55; G06F 21/604; G06F 21/36;
(Continued)

(56) References Cited

U.S. PATENT DOCUMENTS 6,460,022 B1 * 10/2002 Plotkin ............... G06F 21/62
705/51
6,749,116 B2 6/2004 Massaro
(Continued)

FOREIGN PATENT DOCUMENTS

EP 0973112 1/2000

OTHER PUBLICATIONS

Office Action, dated Jun. 6, 2018, from corresponding U.S. Appl. No. 14/477,108.
(Continued)

*Primary Examiner* — Robert B Leung
*Assistant Examiner* — Thomas Ho
(74) *Attorney, Agent, or Firm* — Brient IP Law, LLC (57) ABSTRACT

A price-mining prevention system, in various embodiments, is configured for: (A) detecting an access to a particular web page containing pricing information; (B) determining whether a source of the access is an individual employed by one or more competitors of a company that owns the particular web page being accessed; and (C) at least partially in response to determining that the individual is employed by one or more competitors of a company that owns the particular web page being assessed, taking one or more defensive actions against the source of the access. The step of determining whether the individual is employed by a competitor of the company may comprise scanning a post made on one or more public message boards to determine, based on the content of the post, whether the message board poster is employed by a competitor of a company that owns the particular web page.

26 Claims, 5 Drawing Sheets

(51) Int. Cl.
*G06Q 30/06* (2012.01)
*G06Q 10/10* (2012.01)
*G06F 16/951* (2019.01)
*G06F 16/2458* (2019.01)
*G06F 21/55* (2013.01)
*G06F 21/60* (2013.01)
*G06Q 30/02* (2012.01)
*G06Q 50/00* (2012.01)

(52) U.S. Cl.
CPC .............. *G06F 21/36* (2013.01); *G06F 21/55* (2013.01); *G06F 21/604* (2013.01); *G06Q 10/1053* (2013.01); *G06Q 30/0201* (2013.01); *G06Q 30/0206* (2013.01); *G06Q 30/0601* (2013.01); *H04L 63/10* (2013.01); *G06F 2221/2133* (2013.01); *G06Q 50/01* (2013.01)

(58) Field of Classification Search
CPC ......... G06F 17/30864; G06F 17/30539; G06F 2221/2133; G06Q 30/0206; G06Q 30/0201; G06Q 10/1053; G06Q 30/0601; G06Q 50/01
See application file for complete search history.

(56) References Cited

U.S. PATENT DOCUMENTS

| | | | |
|---|---|---|---|
| 6,938,170 B1 | 8/2005 | Kraft et al. | |
| 7,421,645 B2 | 9/2008 | Reynar | |
| 7,685,271 B1* | 3/2010 | Schneider | H04L 63/1416 709/204 |
| 7,778,919 B2 | 8/2010 | Waelbroeck et al. | |
| 7,912,755 B2 | 3/2011 | Perry et al. | |
| 8,050,976 B2 | 11/2011 | Staib et al. | |
| 8,239,282 B2 | 8/2012 | Tuflija et al. | |
| 8,249,885 B2 | 8/2012 | Berkowitz et al. | |
| 8,346,536 B2 | 1/2013 | Jiang et al. | |
| 8,438,072 B2 | 5/2013 | Fusz et al. | |
| 8,522,270 B2 | 8/2013 | Chatter et al. | |
| 8,548,872 B1 | 10/2013 | Gupta et al. | |
| 8,583,483 B2 | 11/2013 | Patwa et al. | |
| 8,589,694 B2* | 11/2013 | Clark | G06F 21/31 713/168 |
| 9,037,504 B2 | 5/2015 | Nair | |
| 9,202,229 B2 | 12/2015 | Junger | |
| 9,311,662 B2 | 4/2016 | Skinner | |
| 2001/0047308 A1 | 11/2001 | Kaminsky et al. | |
| 2002/0072984 A1 | 6/2002 | Rothman et al. | |
| 2003/0110400 A1 | 6/2003 | Cartmell et al. | |
| 2007/0239560 A1 | 10/2007 | McGuire et al. | |
| 2008/0201214 A1 | 8/2008 | Aaron et al. | |
| 2009/0254455 A1 | 10/2009 | Rothey et al. | |
| 2010/0169194 A1 | 7/2010 | Richey et al. | |
| 2010/0251366 A1 | 9/2010 | Baldry | |
| 2010/0262688 A1* | 10/2010 | Hussain | H04L 63/1433 709/224 |
| 2011/0029781 A1 | 2/2011 | Clark et al. | |
| 2011/0270969 A1 | 11/2011 | Noh et al. | |
| 2012/0046998 A1 | 2/2012 | Staib et al. | |
| 2012/0221485 A1 | 8/2012 | Leidner et al. | |
| 2012/0226558 A1 | 9/2012 | Robyor | |
| 2012/0303412 A1 | 11/2012 | Etzioni et al. | |
| 2013/0132159 A1 | 5/2013 | Wells | |
| 2013/0160079 A1 | 6/2013 | Hebert | |
| 2014/0047111 A1 | 2/2014 | Petta et al. | |
| 2014/0089042 A1 | 3/2014 | Dufresne et al. | |
| 2014/0108090 A1* | 4/2014 | Hwang | G06Q 30/02 705/7.29 |
| 2014/0129288 A1 | 5/2014 | Eager et al. | |
| 2014/0214617 A1 | 7/2014 | Plouffe et al. | |
| 2014/0279189 A1 | 9/2014 | Kubicki et al. | |
| 2014/0304059 A1* | 10/2014 | Wang | G06Q 30/0234 705/14.34 |
| 2015/0220975 A1 | 8/2015 | Rychak | |
| 2016/0226911 A1* | 8/2016 | Boss | H04L 63/20 |

OTHER PUBLICATIONS

Office Action, dated Jun. 20, 2018, from corresponding U.S. Appl. No. 14/586,201.
Final Office Action, dated Nov. 8, 2017, from corresponding U.S. Appl. No. 14/586,201.
Restriction Requirement, dated Nov. 30, 2017, from corresponding U.S. Appl. No. 14/477,108.
Basso et al., Preventing Massive Automated Access to Web Resources, Computers and Security 28, 2009, pp. 174-188, Retrieved from the Internet: https://www.researchgate.net/profile/Alessandro_Basso/publication/222660321_Preventing_massive_automated_access_to_web_resources/links/02fe5137bd77826ca000000.pdf, entire document.
International Search Report, dated Mar. 18, 2016, from corresponding International Application No. PCT/US2016/013273.
Notice of Allowance, dated Nov. 30, 2016, from corresponding U.S. Appl. No. 14/597,029.
Office Action, dated Apr. 19, 2016, from corresponding U.S. Appl. No. 14/597,029.
Rosenfeld, Spiders and Crawlers and Bots, Oh My: The Economic Efficiency and Public Policy of Online Contracts that Restrict Data Collection, In: Stanford Technology Law Review 3, 2002, Retrieved from https: //journals.law.stanford.edu/sites/default/files/stanford-technology-law-review/online/rosenfeld-spiders-crawlers-bots.pdf, entire document.
Written Opinion of the International Searching Authority, dated Mar. 18, 2016, from corresponding International Application No. PCT/US2016/013273.
International Preliminary Report on Patentability, dated Jul. 5, 2016, from corresponding International Application No. PCT/US2014/072759.
International Preliminary Report of Patentability, dated Dec. 15, 2016, from corresponding International Application No. PCT/US2015/033544.
International Search Report, dated Oct. 28, 2015, from corresponding International Application No. PCT/US2015/033544.
Written Opinion of the International Searching Authority, dated Oct. 28, 2015, from corresponding International Application No. PCT/US2015/033544.
Apgar, S., & Writer, S. (Nov. 30, 1991). Metro retailers kick off holiday shopping season with all-out bargain blitz. Star Tribune Retrieved from http://search.proquest.com/docview/418334202?accountid=14753.
Final Office Action, dated Aug. 31, 2016, from corresponding U.S. Appl. No. 14/145,474.
Final Office Action, dated Mar. 31, 2015, from corresponding U.S. Appl. No. 14/145,474.
International Preliminary Report on Patentability, dated Jul. 5, 2016, from corresponding International Application No. PCT/US2014/072771.
International Search Report, dated Mar. 26, 2015, from corresponding International Application No. PCT/US2014/072771.
Office Action, dated Jan. 15, 2016, from corresponding U.S. Appl. No. 14/145,474.
Office Action, dated May 14, 2014, from corresponding U.S. Appl. No. 14/145,474.
Office Action, dated Nov. 12, 2014, from corresponding U.S. Appl. No. 14/145,474.
Sharon Linstedt—News, Business Reporter. (Dec. 11, 1994 ). How Supermarkets Vie to Keep You. Buffalo News Retrieved from http://search.proquest.com/docview/381043976?accountid=14753.
Written Opinion of the International Searching Authority, dated Mar. 26, 2015, from corresponding International Application No. PCT/US2014/072771.
Office Action, dated Mar. 2, 2017, from corresponding U.S. Appl. No. 14/586,201.

(56) References Cited

OTHER PUBLICATIONS

Restriction Requirement, dated Feb. 14, 2014, from corresponding U.S. Appl. No. 14/145,474.
Restriction Requirement, dated Jan. 29, 2016, from corresponding U.S. Appl. No. 14/597,029.
International Search Report, dated Apr. 23, 2015, from corresponding International Application No. PCT/US2014/072759.
Written Opinion of the International Searching Authority, dated Apr. 23, 2015, from corresponding International Application No. PCT/US2014/072759.
Office Action, dated Sep. 21, 2018, from corresponding U.S. Appl. No. 15/178,226.
Restriction Requirement, dated Oct. 4, 2018, from corresponding U.S. Appl. No. 15/269,717.
Final Office Action, dated Dec. 21, 2018, from corresponding U.S. Appl. No. 14/586,201.
Final Office Action, dated Feb. 7, 2019, from corresponding U.S. Appl. No. 14/477,108.
Office Action, dated Feb. 14, 2019, from corresponding U.S. Appl. No. 15/269,717.
Final Office Action, dated May 1, 2019, from corresponding U.S. Appl. No. 15/178,226.

\* cited by examiner

PRICE MINING PREVENTION SYSTEMS AND RELATED METHODS

CROSS-REFERENCE TO RELATED APPLICATIONS

This application is a continuation-in-part of U.S. patent application Ser. No. 14/597,029, filed Jan. 14, 2015, entitled "Price Mining Prevention Systems and Related Methods", the entire disclosure of which is hereby incorporated by reference in its entirety.

BACKGROUND

Online retailers and others may desire to price products they offer in a competitive manner to improve sales. Such retailers may further desire to prevent competitors from undercutting their prices. Accordingly, there is a need for improved systems and methods that address these needs.

SUMMARY

A non-transitory computer-readable medium storing computer-executable instructions for preventing an unwanted access source from mining pricing information on an online retail website by: (A) detecting, by one or more computer processors, an access to a particular web page containing pricing information; (B) determining, by one or more computer processors, whether a source of the access is an individual employed by one or more competitors of a company that owns the particular web page being accessed; and (C) at least partially in response to determining that the individual is employed by one or more competitors of a company that owns the particular web page being assessed, taking, by one or more computer processors, one or more defensive actions against the source of the access.

A computer-implemented method for preventing an unwanted access source from mining pricing information on an online retail website, the computer-implemented method comprising the steps of: (A) detecting, by one or more computer processors, an access to a particular web page containing pricing information; (B) determining, by one or more computer processors, whether a source of the access is an individual that is employed by one or more competitors of a company and that owns the particular web page being accessed; (C) determining, by one or more computer processors, a job title of the individual; (D) determining, by one or more computer processors, based on the job title, that the individual should be prohibited from obtaining pricing information from the online retail website; and (E) in response to determining that the individual should be prohibited from obtaining pricing information from the online retail website, taking, by a processor, one or more defensive actions against the source of the access.

BRIEF DESCRIPTION OF THE DRAWINGS

Various embodiments of a system and method for pricing products are described below. In the course of this description, reference will be made to the accompanying drawings, which are not necessarily drawn to scale, and wherein.

DETAILED DESCRIPTION

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Various companies may attempt to mine data from websites and other sources about their competitors using bots and/or people to access the data. This data may include, for example, product data, pricing data, and other suitable data associated with one or more products offered for sale via a particular web page. In particular embodiments, a price mining prevention system may be configured to detect and analyze website access and enable web site administrators to implement one or more defenses to prevent unwanted access. In various embodiments, the system may, for example: (1) detect access to a web page from a particular source; (2) determine whether the particular source may be an unwanted source; and (3) at least partially in response to determining that the particular source is an unwanted source, take a defensive action against the particular source (e.g., by blocking further access from that particular source).

In particular embodiments, the system may be configured to determine that a particular access of a web page is a potentially unwanted access based at least in part on: (1) an IP address from which the web page was accessed (e.g., a particular competitor may own a particular range of one or more IP addresses and the accessing IP address may be within that particular range); (2) a zip code associated with an IP address from which the web page was accessed (e.g., because a particular competitor may have offices or be headquartered at that zip code); (3) a user associated with the IP address from which the web page was accessed (e.g., the user may be an employee of a competitor or associated with a competitor); (4) an access pattern from a particular IP address (e.g., systematic access from a particular IP address); and/or (5) any other suitable factor.

In various embodiments, the system is configured to track access to one or more websites (e.g., one or more related websites associated with a particular company). The system may then identify access patterns (e.g., from a particular IP address) in order to determine whether a particular access is substantially automated. The system may make this determination based at least in part on: (1) frequency of access (e.g., how often the website is accessed); (2) number of particular web pages accessed; and/or (3) any other suitable factor.

In particular embodiments, at least partially in response to determining that a particular access may be substantially automated (e.g., the access may be by a bot rather than a human user), the system may be configured to verify that the access is by a human by requiring completion of one or more Completely Automated Public Turing Tests to tell Computers and Humans Apart (CAPTCHA). In other embodiments, the system may be configured to substantially automatically block access from a source determined to be substantially automated.

In other embodiments, the system may be configured to substantially prevent access to one or more particular web pages by particular human users (e.g., in addition to automated bots). For example, the system may be configured to block access to one or more particular web pages by employees or other persons associated with a particular company who may be attempting to access web pages to ascertain data such as the data described above. In various embodiments, the system may be configured to identify individuals accessing a particular web page as individuals associated with a competitor by, for example: (1) requiring individuals accessing the particular web page to register an account; and (2) using a particular individual's account information to determine if the individual is a known employee of a competitor (e.g., because the individual is listed as an employee on the competitor's web page or other publicly available employee list).

In various embodiments, the system may be configured to determine that a particular individual is an employee of or otherwise associated with a competitor based at least in part on social networking data associated with the particular individual. For example, the system may search one or more social networks for users that have registered with a similar name or email address as a particular individual that has registered for an account with their web page. The system may then be configured to mine any associated social network accounts (e.g., Facebook, Twitter, Foursquare, Instagram, etc.) to determine an employer of the particular individual as well as any other potentially useful information about the individual.

In various embodiments, the system is configured to analyze website access and determine and implement particular defensive measures (e.g., blocking, CAPTCHA requirement, etc.) substantially in real time. In other embodiments, the system is configured to review and analyze access data from a log of access information at a later time from when the access occurred.

In particular embodiments, the system is embodied as a plugin for a particular website that is offered as a service provided by a price mining prevention company. In various embodiments, the system (or the price mining prevention company) may track access by all customers of the service, which may, for example, enable the price mining prevention company to determine unwanted access, which may come from one or more non-competitor sources (e.g., access from third party companies hired by competitors of their companies to monitor pricing data).

In various embodiments, a price mining prevention system may enable websites to at least substantially reduce unwanted web traffic to their websites. In particular embodiments, the system may enable websites to substantially prevent competitors from accessing pricing and other data available on their websites.

Example Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

Figure 1:
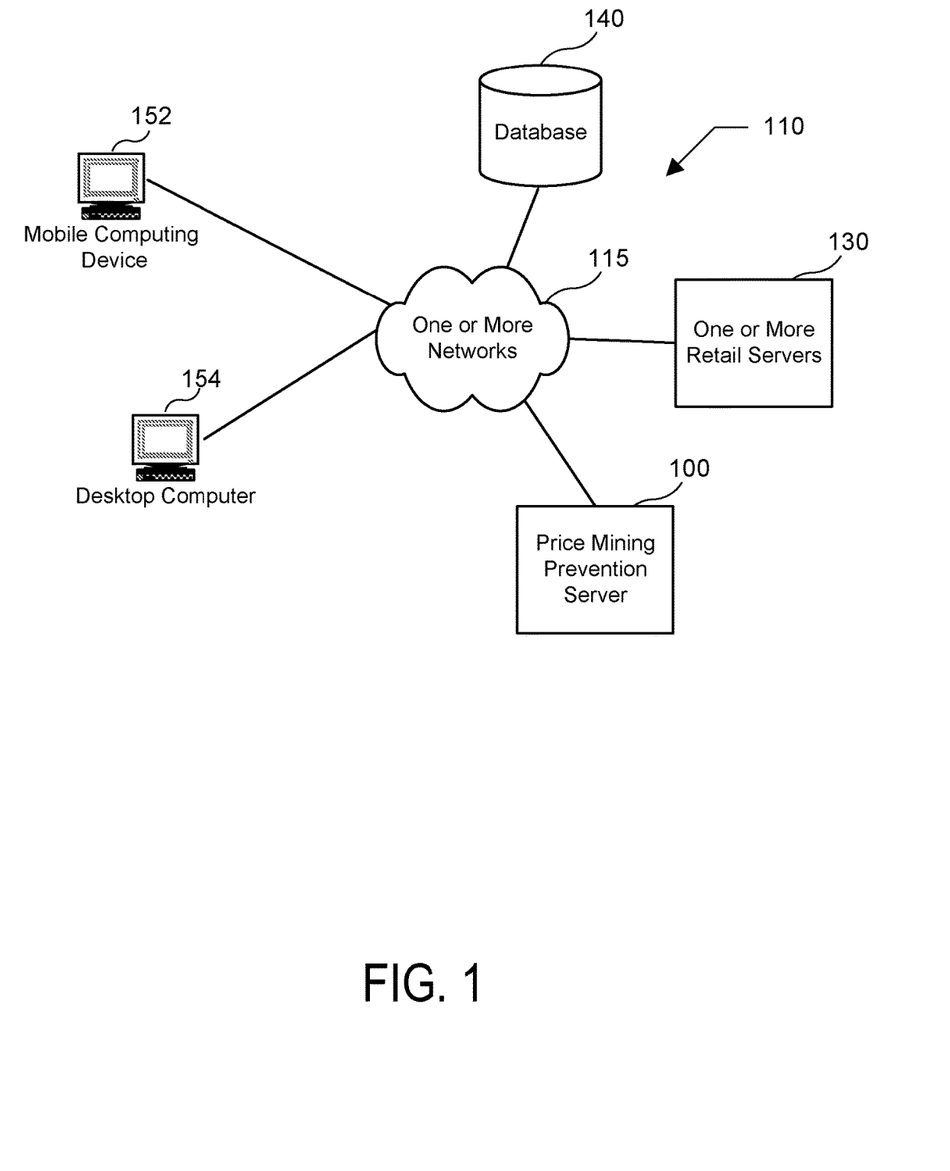
FIG. 1 is a block diagram of a price mining prevention server in accordance with an embodiment of the present system.

FIG. 1 is a block diagram of a System 110 according to a particular embodiment. As may be understood from this figure, the System 110 includes One or More Networks 115, a Price Mining Prevention Server 100, One or More Retail Servers 130, a Database 140, and one or more remote computing devices, such as a Mobile Computing Device 152 (e.g., a smart phone, a tablet computer, a wearable computing device, a laptop computer, etc.), or a Desktop Computer 154. In particular embodiments, the One or More Networks facilitate communication between the Price Mining Prevention Server 100, One or More Retail Servers 130, the Database 140, and the one or more remote computing devices 152, 154.

The one or more computer networks 115 may include any of a variety of types of wired or wireless computer networks such as the Internet, a private intranet, a mesh network, a public switch telephone network (PSTN), or any other type of network (e.g., a network that uses Bluetooth or near field communications to facilitate communication between computers). The communication link between the Price Mining Prevention Server 100 and Database 140 may be, for example, implemented via a Local Area Network (LAN) or via the Internet.

Figure 2:
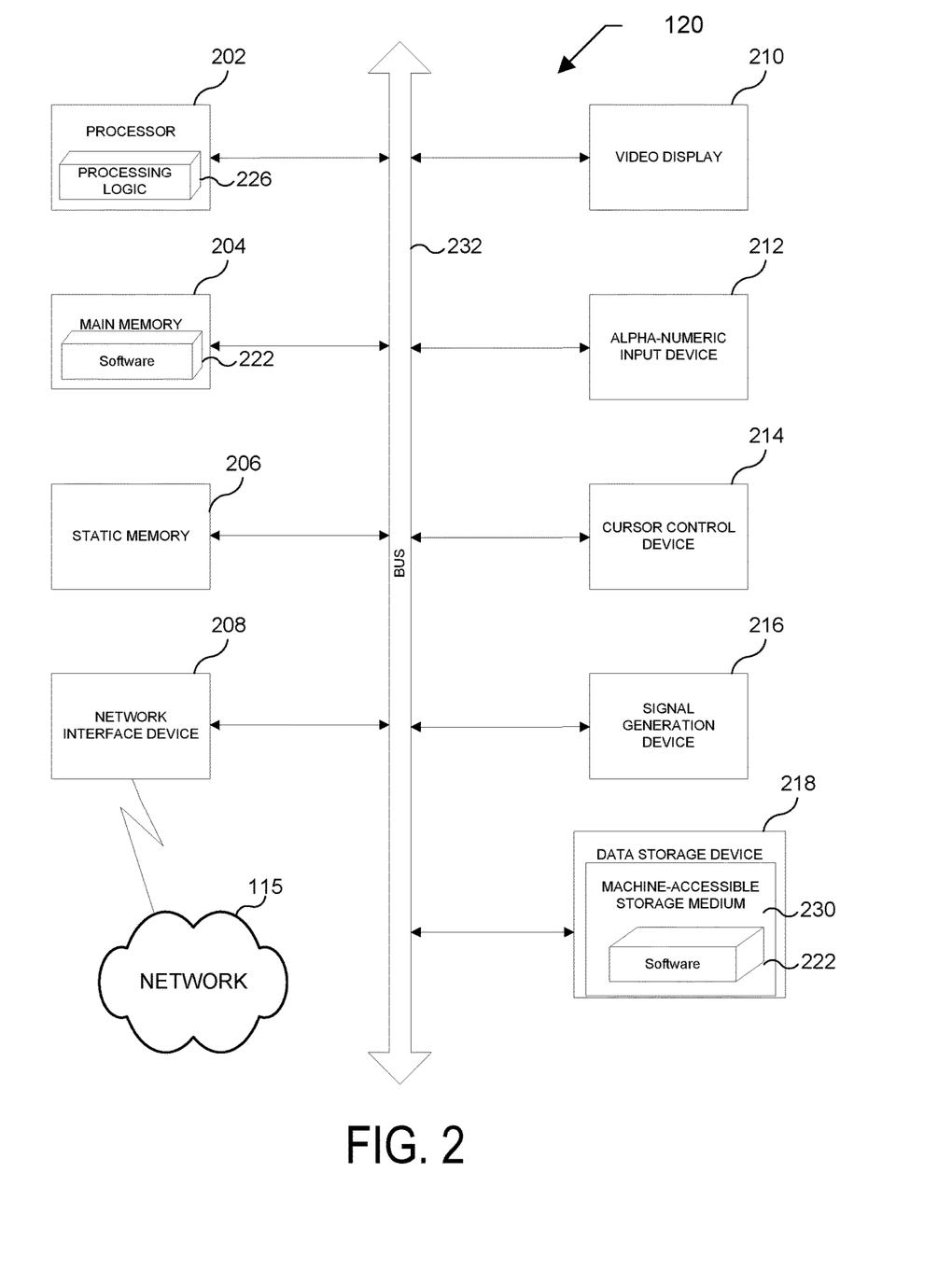
FIG. 2 is a schematic diagram of a computer, such as the price mining prevention server of FIG. 1, that is suitable for use in various embodiments.

FIG. 2 illustrates a diagrammatic representation of a Computer 120 that can be used within the System 110, for example, as a client computer (e.g., one of the remote computing devices 152, 154 shown in FIG. 1), or as a server computer (e.g., Price Mining Prevention Server 100 shown in FIG. 1). In particular embodiments, the Computer 120 may be suitable for use as a computer within the context of the System 110 that is configured for collecting, tracking, and storing price mining prevention data.

In particular embodiments, the Computer 120 may be connected (e.g., networked) to other computers in a LAN, an intranet, an extranet, and/or the Internet. As noted above, the Computer 120 may operate in the capacity of a server or a client computer in a client-server network environment, or as a peer computer in a peer-to-peer (or distributed) network environment. The Computer 120 may be a desktop personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An example Computer 120 includes a Processor 202, a Main Memory 204 (e.g., read-only memory (ROM), flash memory, dynamic random access memory (DRAM) such as synchronous DRAM (SDRAM) or Rambus DRAM (RDRAM), etc.), a Static Memory 206 (e.g., flash memory, static random access memory (SRAM), etc.), and a Data Storage Device 218, which communicate with each other via a Bus 232.

The Processor 202 represents one or more general-purpose or specific Processors such as a microprocessor, a central processing unit, or the like. More particularly, the Processor 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The Processor 202 may also be one or more special-purpose Processors such as an application specific integrated circuit (ASIC), a field programmable gate array (FPGA), a digital signal processor (DSP), network processor, or the like. The Processor 202 may be configured to execute Processing Logic 226 for performing various operations and steps discussed herein.

The Computer 120 may further include a Network Interface Device 208. The Computer 120 also may include a Video Display 210 (e.g., a liquid crystal display (LCD) or a cathode ray tube (CRT)), an Alpha-Numeric Input Device 212 (e.g., a keyboard), a Cursor Control Device 214 (e.g., a mouse), and a Signal Generation Device 216 (e.g., a speaker).

The Data Storage Device 218 may include a Machine-Accessible Storage Medium (e.g., a non-transitory computer-accessible storage medium) 230 (also known as a non-transitory computer-readable storage medium or a non-transitory computer-readable medium) on which is stored one or more sets of instructions (e.g., Software 222) embodying any one or more of the methodologies or functions described herein. The Software 222 may also reside, completely or at least partially, within the Main Memory 204 and/or within the Processor 202 during execution thereof by the Computer 120—the Main Memory 204 and the Processor 202 also constituting computer-accessible storage media. The Software 222 may further be transmitted or received over a Network 115 via a Network Interface Device 208.

While the Machine-Accessible Storage Medium 230 is shown in an example embodiment to be a single medium, the terms "computer-accessible storage medium" and "computer-readable medium" should be understood to include a single medium or multiple media (e.g., a centralized or distributed database, and/or associated caches and servers) that store the one or more sets of instructions. The terms "computer-accessible storage medium" and "computer-readable medium" should also be understood to include any medium (e.g., non-transitory medium) that is capable of storing, encoding or carrying a set of instructions for execution by the Computer 120 and that cause the Computer 120 to perform any one or more of the methodologies of the present invention. The terms "computer-accessible storage medium" and "computer-readable medium" should accordingly be understood to include, but not be limited to, solid-state memories, optical and magnetic media, etc.

Exemplary System Platform

Figure 3:
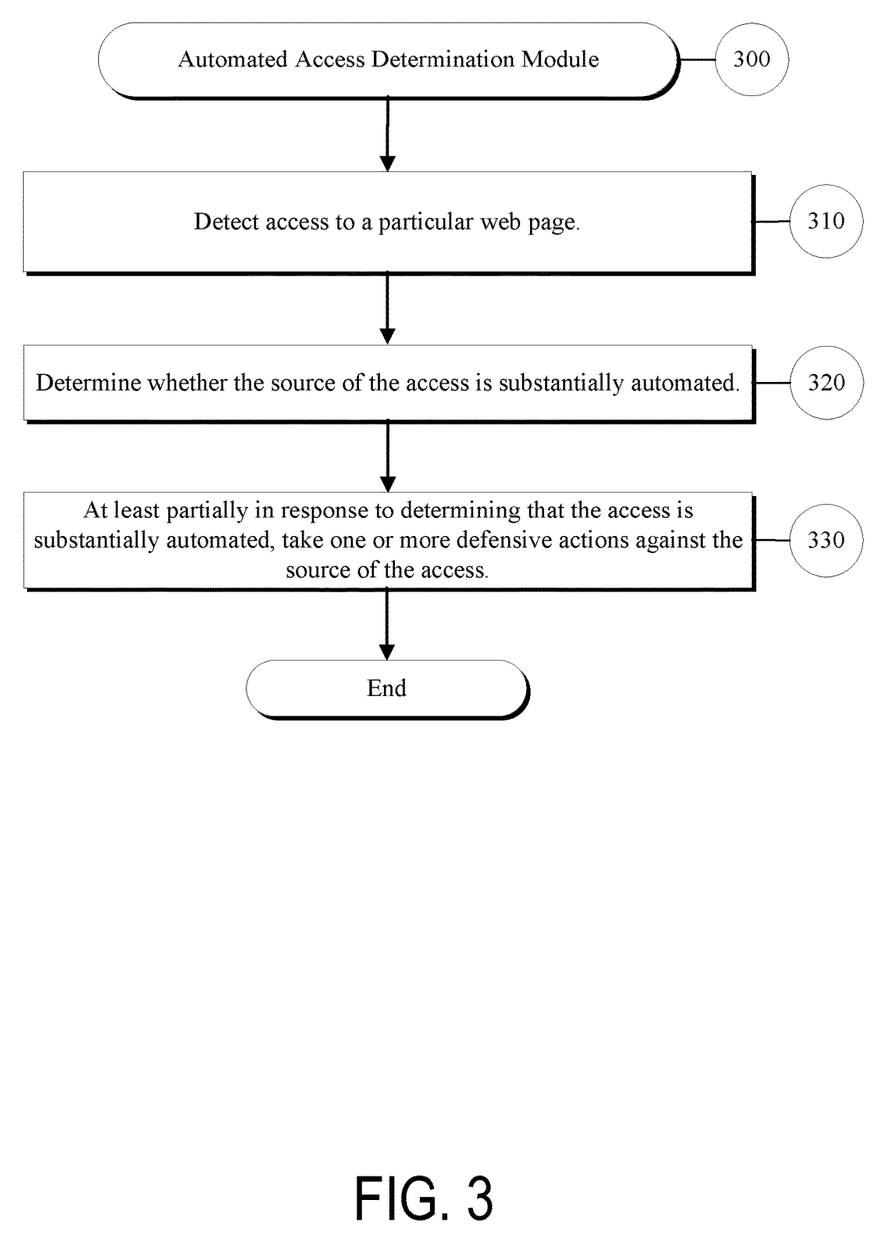
FIG. 3 depicts a flow chart that generally illustrates various steps executed by an automated access determination module that, for example, may be executed by the price mining prevention server of FIG. 1.
Figure 4:
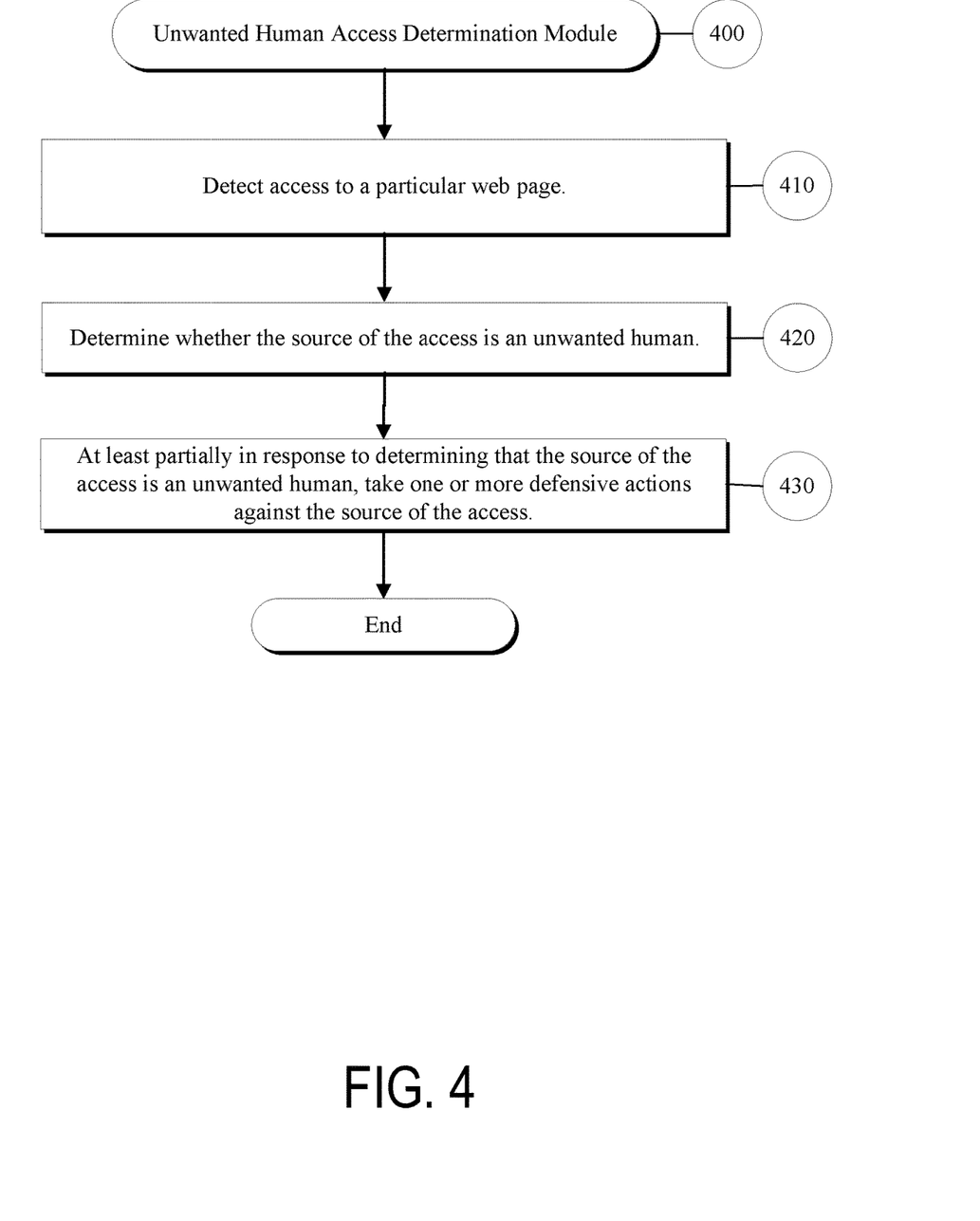
FIG. 4 depicts a flow chart that generally illustrates various steps executed by an unwanted human access determination module that, for example, may be executed by the price mining prevention server of FIG. 1.
Figure 5:
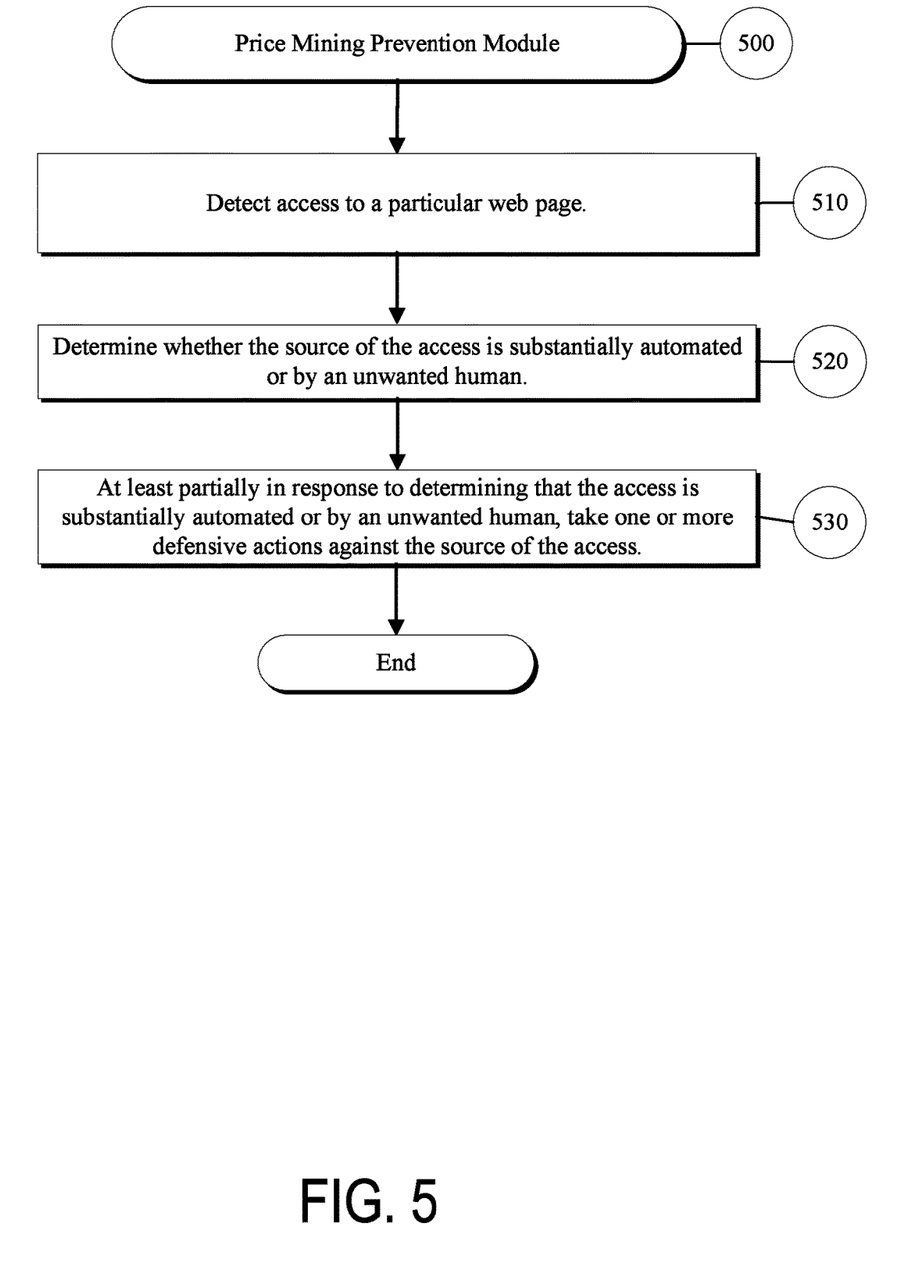
FIG. 5 depicts a flow chart that generally illustrates various steps executed by a price mining prevention module that, for example, may be executed by the price mining prevention server of FIG. 1.

Various embodiments of a system for preventing price and other data mining on one or more online retail websites are described below and may be implemented in any suitable context. Various aspects of the system's functionality may be executed by certain system modules, including an Automated Access Determination Module 300, an Unwanted Human Access Determination Module 400, and a Price Mining Prevention Module 500. These modules are discussed in greater detail below.

Automated Access Determination Module

FIG. 3 is a flow diagram of an exemplary Automated Access Determination Module 300. The Automated Access Determination Module 300 may, for example, be implemented by a computer system such as the System 110 of FIG. 1. Returning to FIG. 3, at Step 310, the system begins by detecting access to a particular web page. In various embodiments, the system is configured to detect access in response to receiving a request to access the particular web page. The request to access the web page may occur when the web page is accessed from a link provided by a search engine, when the web page is accessed from an advertising link on a separate web page, or when the web page is accessed directly by the web page address being entered into the address bar of a suitable internet browser.

When the system detects access to the web page at Step 310, the system may, for example, collect data associated with the source of the access such as the IP address, the operating system information, the web browser information, the user agent string, the search terms used to access the web page, the advertising link used to access the web page, or other information relating to the method used to access the web page or the source of the access.

The system then advances to Step 320, where it determines, at least partially based on the data associated with the source of the access, whether the source of the access may be substantially automated. In various embodiments, the system is configured to detect substantially automated access such as by one or more bots or one or more web crawlers. The system may use the data associated with the source of the access to determine that the access is substantially automated by retrieving information on access patterns of the source of the access. Such access patterns may include the frequency of the access and the number of web pages accessed within a particular website. For instance, if the access pattern shows that a particular IP address frequently accesses the same web page, the system may determine that the source of the access is automated. In addition, if the system detects that a particular IP address accesses every web page of a particular website, the system may also determine that the source of the access is automated.

Access patterns may also include similar access patterns based on other factors than the data associated with the source. For instance, the system may determine access patterns based on frequent access to web pages for particular products, for instance, an Apple iPad Air, or for particular types of products, for instance, a tablet computing device. The system may, for example, be configured to determine that a particular access is substantially automated based at least in part on determining that a source of access accesses one or more products from a particular class of products during a particular access of a particular website.

For example, a source of access may access one or more web pages of a particular online retail website during a particular visit. The system may determine, for example, that the source of access has accessed a greater number of product pages during a particular visit than a typical user (e.g., a typical online shopper) would access during a typical visit. For example, the system may determine that a typical user, when shopping for televisions, visits a product page for a particular number of televisions before making a purchase (e.g., the user may view information for between about 4 and about 6 televisions before making a purchase). In such embodiments, the system may determine that a source of access that views product and pricing information for more than about ten different televisions during the visit is likely to be a substantially automated access (e.g., because a typical user would not likely have viewed so many televisions during a single visit). In various embodiments, the system may determine that a source of access viewing product information for such a large number of products is more likely to be a source that is simply substantially automatically mining data rather than a legitimate user of the website.

In advancing to Step 330, the system then, at least partially in response to determining that the access is substantially automated, takes one or more defensive actions against the source of the access. In various embodiments, the defensive action may include determining whether the source of the access is a human. In various embodiments, the system may determine whether the source is a human by requiring registration of a user account to continue to access the web page. If no user account is created, the system may deny access to the web page from the particular source. In other embodiments, the system may require completion of a CAPTCHA before the source can continue to access the web page. At least partially in response to determining that the source of the access has not completed the CAPTCHA, the system may deny access to the web page. In still other embodiments, the system may take any other suitable defensive action to verify that the source is a human and not an automated source.

Unwanted Human Access Determination Module

FIG. 4 is a flow diagram of an exemplary Unwanted Human Access Determination Module 400. The Unwanted Human Access Determination Module 300 may, for example, be implemented by a computer system such as the System 110 of FIG. 1. Turning again to FIG. 4, the system begins at Step 410 by detecting access to a particular web page. In various embodiments, the system is configured to detect access in response to receiving a request to access the particular web page. The request to access the web page may occur when the web page is accessed from a link provided by a search engine, when the web page is accessed from an advertising link on a separate web page, when the web page is accessed directly from the web page address being entered into the address bar of a suitable internet browser, or in any other suitable way.

When the system detects access to the web page at Step 410, the system, in various embodiments, collects data associated with the source of the access such as: (1) IP address information; (2) operating system information; (3) web browser information; (4) one or more user agent strings; (5) one or more search terms used to identify and/or access the web page; (6) an advertising link used to access the web page; and/or (7) other information relating to the method used to access the web page and/or the source of the access. The system may, in particular embodiments, collect other information about the source of the access including an email address if the source has a registered account for the web page, or other information associated with the registered account such as, for example, a name of the user, an address of the user, etc.

Proceeding to Step 420, the system determines, based at least in part on information associated with the source of the access, whether the source of the access may be an unwanted human. The system may gather this information, for example, from the IP address of the source, the email address if the source has a registered account with the web page, the operating system of the source, the web browser information of the source, the user agent string of the source, or any other suitable information. In a particular embodiment, the system is configured to determine a location (e.g., a particular city or area from which the source of the access originates) of the source of the access (e.g., based at least in part on an IP address of the source) and further determine whether the determined location may be a location from which access is not desired. For example, the system may determine that the location of the source is a location associated with a particular competitor, particular independent company that is known for providing price-mining or other data-mining services, etc. The system may, in response to making such a determination, determine that the source is an unwanted one.

In various embodiments, the source of the access may register or have a registered account for the web page the user is accessing that is the same email address used on another web site such as a social networking site, a professional networking site, or other website (e.g., Facebook, LinkedIn, Twitter, Google, Spokeo, Pipl, county tax assessor's property records, etc.). The system, in various embodiments, may then conduct a search (e.g., an automated search) of these websites in order to determine, for example, the source's name, alma mater(s), occupation, one or more businesses the source is following (e.g., on the social media website), one or more groups the source is a part of, one or more businesses where the source has "checked in," current and past employers of the source, one or more addresses of the source, one or more neighbors of the source based on the current or previous address, one or more friends or connections of the source, one or more relatives of the source, the current and past employers of the neighbors and/or friends or relatives, etc.

After gathering the information on the source of the access, the system may determine that the source accessing the web page may be an unwanted human based on the source being an employee or independent contractor of a competitor, a friend of an employee of a competitor, a relative of an employee of a competitor, a neighbor of an employee of a competitor, or any other person that is likely to be attempting to gain access to the web page for pricing or other information. For example, if the system determines that the same email address used to register at the web site was the same email address linked to a specific Facebook account, the system may (e.g., at least substantially automatically) access the source's Facebook page to determine the employer of the source of the access. In a particular example, in response to the system determining that the employer of the source of the access is a competitor to the owner of the web page being accessed, the system may determine that the source of the access is an unwanted human. Similarly, the system may also be configured to see employers of the friends of the source of the access who do not have such access protected with privacy settings. In response to the system determining that the employer of the friend of the source of the access is a competitor to the owner of the web page being accessed, the system may determine that the source of the access is an unwanted human.

In particular embodiments, the system is further configured to determine that the source of the access is an unwanted human based, at least in part, on other information related to the source. For instance, in response to the system determining that the IP address is associated with owned by a competitor, the system may determine that the source is an unwanted human. In addition, if the email address of the source of the access is owned by a competitor, the system may determine that the source is an unwanted human. In other embodiments, the system may be configured to determine whether a domain associated with the email address of the source is associated with a potential competitor, or one or more potential third party companies that a competitor may have contracted with to mine pricing information and other data. The system may, for example, conduct a string search of an email address associated with the source to determine whether the name of a particular entity is included in the e-mail address or the e-mail domain. In various embodiments, the one or more third party companies may include, for example, one or more law firms, one or more auditing companies, one or more price consulting companies, or any other company which may be mining pricing data. Furthermore, if the geographic region associated with the IP address of the source of the access is similar to or the same as the geographic region where a competitor has an office, the system may determine that the source is likely to be an unwanted human.

In the next step, Step 430, the system, at least partially in response to determining that the source of the access is an unwanted human, takes one or more defensive actions against the source of the access. In various embodiments, the defensive action can be to block the source of the access to the web page. The system may block the source by blocking the IP address associated with the unwanted human. In other embodiments, the system may, for example, limit a number of access by the particular source determined to have been an unwanted human (e.g., to only 1, 2, 3, 4, 5 or other predetermined number of visits within a particular time period, such as per day). In particular embodiments, the system is configured to limit a number of accesses by a source determined to have been an unwanted human to between one and ten accesses per day (e.g., 2, 3, 4, 5, 6, or 7 accesses per 24 hour period). Such a course of action may, for example, enable the system to prevent an unwanted human from mining data from a particular online retail website, but still allow the unwanted human to patronize the online retail website (e.g., to shop on the online retail website outside the context of the user being an employee of a competitor). In other embodiments, the system may take any other suitable defensive action to block or otherwise limit the access to the website of the unwanted human.

Price Mining Prevention Module

FIG. 5 is a flow diagram of an exemplary Price Mining Prevention Module 500. The Price Mining Prevention Module 500 may, for example, be implemented by a computer system such as the System 110 of FIG. 1. Turning again to FIG. 5, the system begins at Step 510 by detecting access to a particular web page. In various embodiments, the system is configured to detect access in response to receiving a request to access the particular web page. The request to access the web page may occur when the web page is accessed from a link provided by a search engine, when the web page is accessed from an advertising link on a separate web page, or when the web page is accessed directly from the web page address being entered into the address bar of a suitable internet browser.

In response to detecting access to the web page at Step 510, the system, in various embodiments, collects data associated with the source of the access such as: (1) IP address information; (2) operating system information; (3) web browser information; (4) one or more user agent strings; (5) one or more search terms used to identify and/or access the web page; (6) an advertising link used to access the web page; and/or (7) other information relating to the method used to access the web page and/or the source of the access. The system may, in particular embodiments, collect other information about the source of the access including an email address if the source has a registered account for the web page, or other information associated with the registered account such as, for example, a name of the user, an address of the user, etc.

Next, in Step 520, the system determines whether the access is substantially automated or by an unwanted human. In determining whether the access is substantially automated, the system, in various embodiments, may undergo the same process detailed in Step 320 in FIG. 3. Similarly, in determining whether the access is by an unwanted human, the system may undergo the same process detailed in Step 420 in FIG. 4.

Turning to FIG. 5, after completing Step 520, the system proceeds to Step 530 where, at least partially in response to determining that the source of the access may be substantially automated or by an unwanted human, the system take one or more defensive actions against the source of the access. Such defensive actions may include, for example, blocking access to the web page, requiring the source of the access to register for a user account, or requiring the source of the access to complete a CAPTCHA. Requiring the source to register with the web page may enable the system to collect more information about the source to determine with greater certainty that the source is an unwanted human. In addition, if no user account is created, the system may be configured to deny access to the web page. In various embodiments, the system is configured to block access at the router level, at the network level, on a software level, or in any other suitable manner.

In various embodiments the system is configured to further determine whether a source determined to be substantially automated is, in fact, unwanted. In such embodiments, the system may be configured to determine whether a substantially automated source is a favorable source, such as a search engine web crawler or other favorable source, which may, for example, direct or increase traffic to the particular web page. In such embodiments, the system is configured to determine whether the substantially automated source may be favorable, and, in response to determining that it may be favorable, not take any defensive action against that particular favorable automated source.

In other embodiments, the system is configured to provide access to a modified version of a web page to one or more sources of access that the system has determined to be unwanted. The system may, for example: (1) determine that a potentially unwanted source of access is attempting to access a particular web page; (2) at least partially alter data associated with the particular web page to create a modified web page; and (3) provide access to the unwanted source of access to the modified web page. In various embodiments, the data associated with the particular website that the system is configured to at least partially alter may include, for example, pricing information for a particular product, one or more specifications associated with a particular product, or any other suitable product or other data which an unwanted user may be attempting to ascertain.

In particular embodiments, the system is configured to alter pricing information for a particular product on a particular product web page so that the particular product web page displays incorrect pricing information (e.g., pricing information that is higher or lower than the actual price at which the product is offered for sale on the particular web page). In other embodiments, the system is configured to display the correct pricing information as an image rather than as text (e.g., which may, for example, make it more difficult for a source mining pricing information from easily ascertaining pricing information from the particular product page). In still other embodiments, the system is configured to not display any pricing information in response to determining that a potentially unwanted source of access is attempting to access the particular product page. In such embodiments, the system may be configured to allow an unwanted source of access to successfully mine incorrect data.

Illustrative Examples

Exemplary Experience of the Automated Access Determination Module 300

The following describes an exemplary experience of the Automated Access Determination Module 300. In this example, to start, the system begins by determining that a user has accessed a particular web page, for instance, the home page of Amazon.com. The system then gathers information about the user including the user's IP address. In attempting to determine whether the user is an automated user such as a bot, the system prompts the user to complete a CAPTCHA. If the user fails to complete the CAPTCHA, the system blocks the user's access to the web page by blocking access to the IP address of the user.

Exemplary Experience of the Unwanted Human Access Determination Module 400

The following describes an exemplary experience of the Unwanted Human Access Determination Module 400. To begin, the system detects that a user has accessed a particular web page such as Amazon.com. In this case, the user sets up a user account with Amazon.com, entering information that includes, for example, the user's email address, name, address, phone number, etc. This allows the system to search other websites such as Facebook using the name or email address listed by the user in setting up the user's Amazon.com account. Upon determining from the user's Facebook account that the user is employed by Wal-Mart, the system can flag the user as a potential unwanted human and track the user's activity on Amazon.com to determine whether the user is simply shopping on the website, or if the user is going through product listings more systematically so that it appears the user is mining Amazon.com for product pricing information. If the system determines that the user's search pattern is not reflective of the user simply shopping on the website, the system may determine an appropriate defensive action based on the activity of the user and implement the defensive action against the user.

The system may, for example: (1) receive user information from a user creating an account on a particular e-commerce website; (2) use the user information to access additional information associated with the user (e.g., the user's employer information) from a social media account associated with the user or other publicly available information associated with the user; and (3) determine whether to at least partially limit access to one or more web pages based at least in part on the employer information or other additional information.

Alternate Embodiments

Various embodiments of a system for preventing price-mining and other data-mining may include features in addition to those features described above. Such alternative embodiments are described below.

Blacklisting Particular Sources

In various embodiments, the system is configured to blacklist particular sources of access (e.g., particular users, particular IP addresses, etc.) substantially without having to determine whether the source is an unwanted source. In such embodiments, the system may be configured to: (1) receive a listing of one or more sources to blacklist; and (2) substantially automatically block any attempted access by the one or more sources. In such embodiments, the system may be configured to receive the listing of one or more sources to blacklist from, for example, a company that has hired a third party company to prevent price mining on its web page, or from any other suitable source. In particular embodiments, the system may be adapted to automatically compile the blacklist by searching the Internet and/or other sources for indications that particular individuals are employed, in a potential price mining capacity, by one or more entities, such as competitors of the company, and then adding those particular individuals to the blacklist.

In other embodiments, the system may be configured to create a blacklist by, for example, using publicly available information to determine a list of employees of a particular competitor (e.g., via LinkedIn or another social media website, via the competitor's web page, etc.). In various embodiments, the system is configured to determine a blacklist of one or more individuals based at least in part on particular competitor employee's position with the competitor. For example, the system may be configured to blacklist all IT employees of a particular competitor, or blacklist any other suitable employees of a competitor who may be involved (e.g., based at least in part on their position with the competitor) in price mining or other competitive activity.

Public Review and Forum Post Scanning

In various embodiments, the system is configured to scan reviews posted on one or more public web sites as well as posts made on one or more public message boards to determine whether the reviewer or the message board poster may be employed by a competitor or other third party company whose employees may engage in price mining. In such embodiments, the system may be configured to determine that the poster or reviewer is such an individual based at least in part on, for example: (1) content of the post or review; (2) a product or company for which the reviewer has made the review; (3) a topic of the message board; and/or (4) any other suitable factor.

In particular embodiments, the system may determine that a particular poster or reviewer is employed by a particular competitor by, for example, searching a post or review by the particular poster or reviewer for a particular word (e.g., or string of words) which may indicate that the poster or reviewer is employed by the particular competitor. For example, the system may search for instances in a post or review where the poster or reviewer mention an experience while employed by the competitor. In other embodiments, the system is configured to search a plurality of posts or reviews by the same poster or reviewer to ascertain that the poster or reviewer is an employee of the particular competitor. For example, a particular reviewer may post messages to a message board that includes references to their experience as a network administrator. The same reviewer may have posted several reviews for restaurants in Redmond, Wash. The system may, based on this information, determine that the reviewer is an employee of Microsoft, based on their job role and their frequent visits to Microsoft's city of headquarter. In response to determining that a poster or reviewer may be employed by a competitor or other unwanted company, the system may, for example: (1) determine the poster or reviewer's IP address, name, e-mail address; and (2) add that poster or reviewer to a blacklist to block access to that poster or reviewer.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A non-transitory computer-readable medium storing computer-executable instructions for preventing an unwanted access source from mining pricing information on an online retail website by:
   detecting, by one or more computer processors, an access to a particular web page containing pricing information;
   determining, by one or more computer processors, whether a source of the access is an individual employed by one or more competitors of a company that owns the particular web page being accessed; and
   at least partially in response to determining that the individual is employed by one or more competitors of a company that owns the particular web page being assessed, taking, by one or more computer processors, one or more defensive actions against the source of the access, wherein the one or more defensive actions comprise automatically blocking, by a processor, the source of the access from further access to the particular web page.

2. A non-transitory computer-readable medium storing computer-executable instructions for preventing an unwanted access source from mining pricing information on an online retail website by:
   detecting, by one or more computer processors, an access to a particular web page containing pricing information;
   determining, by one or more computer processors, whether a source of the access is an individual employed by one or more competitors of a company that owns the particular web page being accessed; and
   at least partially in response to determining that the individual is employed by one or more competitors of a company that owns the particular web page being assessed, taking, by one or more computer processors, one or more defensive actions against the source of the access, wherein the one or more defensive actions comprise requiring the source of the access to complete one or more CAPTCHAs.

3. The non-transitory computer-readable medium of claim 2, wherein the computer-executable instructions further comprise computer-executable instructions for, at least partially in response to a failure by the source of the access to complete the one or more CAPTCHAs, blocking the source of the access from further access to the particular web page.

4. A non-transitory computer-readable medium storing computer-executable instructions for preventing an unwanted access source from mining pricing information on an online retail website by:
   detecting, by one or more computer processors, an access to a particular web page containing pricing information;
   determining, by one or more computer processors, whether a source of the access is an individual employed by one or more competitors of a company that owns the particular web page being accessed; and
   at least partially in response to determining that the individual is employed by one or more competitors of a company that owns the particular web page being assessed, taking, by one or more computer processors, one or more defensive actions against the source of the access, wherein taking one or more defensive actions comprises limiting a number of accesses to the particular web page by the source to between 1 and 10 accesses in a 24 hour period.

5. The non-transitory computer-readable medium of claim 1, wherein determining whether the source of the access is an individual employed by the one or more competitors, comprises:
   determining that the source of the access is the individual;
   determining at least one identifying piece of data associated with the individual; and
   determining, based at least in part on the at least one identifying piece of data, whether the individual is employed by the one or more competitors.

6. The non-transitory computer-readable medium of claim 5, wherein:
   determining the at least one identifying piece of data associated with the individual comprises determining the at least one identifying piece of data based at least in part on an account associated with the individual for the particular web page; and determining whether the individual is employed by the one or more competitors comprises:

using the at least one identifying piece of data to identify one or more social networking accounts associated with the individual; and determining, from the one or more social networking accounts associated with the individual, employment information associated with the individual.

7. The non-transitory computer-readable medium of claim 6, wherein the employment information comprises the individual's job title.

8. The non-transitory computer-readable medium of claim 1, wherein the step of determining whether a source of the access is an individual employed by one or more competitors of a company that owns the particular web page being accessed comprises determining whether an IP address associated with the source of access is an IP address associated with the one or more competitors.

9. The non-transitory computer-readable medium of claim 1, wherein the step of determining whether a source of the access is an individual employed by one or more competitors of a company that owns the particular web page being accessed comprises scanning a post made on one or more public message boards to determine, based at least in part on the content of the post, whether the message board poster is employed by a competitor of a company that owns the particular web page.

10. The non-transitory computer-readable medium of claim 1, wherein the step of determining whether a source of the access is an individual employed by one or more competitors of a company that owns the particular web page being accessed comprises scanning a review made on one or more public web sites to determine, based at least in part on the content of the review, whether the reviewer is employed by a competitor of a company that owns the particular web page.

11. The non-transitory computer-readable medium of claim 1, wherein the step of determining whether a source of the access is an individual employed by one or more competitors of a company that owns the particular web page being accessed comprises:

obtaining a name of an individual who is the source of access;

determining whether the name is on a list of names of employees of the one or more competitors; and in response to determining that the name is on the list of names of employees, determining that the individual is employed by the one or more competitors.

12. A computer-implemented method for preventing an unwanted access source from mining pricing information on an online retail website, the computer-implemented method comprising the steps of:

detecting, by one or more computer processors, an access to a particular web page containing pricing information;

determining, by one or more computer processors, whether a source of the access is an individual that is employed by one or more competitors of a company that owns the particular web page being accessed;

determining, by one or more computer processors, a job title of the individual;

determining, by one or more computer processors, based on the job title, that the individual should be prohibited from obtaining pricing information from the online retail website; and in response to determining that the individual should be prohibited from obtaining pricing information from the online retail website, taking, by a processor, one or more defensive actions against the source of the access, wherein the one or more defensive actions comprise automatically blocking, by a processor, the source of the access from further access to the particular web page.

13. A computer-implemented method for preventing an unwanted access source from mining pricing information on an online retail website, the computer-implemented method comprising the steps of:

detecting, by one or more computer processors, an access to a particular web page containing pricing information;

determining, by one or more computer processors, whether a source of the access is an individual that is employed by one or more competitors of a company that owns the particular web page being accessed;

determining, by one or more computer processors, a job title of the individual;

determining, by one or more computer processors, based on the job title, that the individual should be prohibited from obtaining pricing information from the online retail website; and in response to determining that the individual should be prohibited from obtaining pricing information from the online retail website, taking, by a processor, one or more defensive actions against the source of the access, wherein the one or more defensive actions comprise requiring the source of the access to complete one or more CAPTCHAs.

14. The computer-implemented method of claim 13, wherein the computer-executable instructions further comprise computer-executable instructions for, at least partially in response to a failure by the source of the access to complete the one or more CAPTCHAs, blocking the source of the access from further access to the particular web page.

15. The computer-implemented method of claim 12, wherein determining whether the source of the access is an individual employed by the one or more competitors, comprises:

determining that the source of the access is the individual;

determining at least one identifying piece of data associated with the individual; and determining, based at least in part on the at least one identifying piece of data, whether the individual is employed by the one or more competitors.

16. The computer-implemented method of claim 15, wherein:

determining the at least one identifying piece of data associated with the individual comprises determining the at least one identifying piece of data based at least in part on an account associated with the individual for the particular web page;

determining whether the individual is employed by the one or more competitors comprises:

using the at least one identifying piece of data to identify one or more social networking accounts associated with the individual; and determining, from the one or more social networking accounts associated with the individual, employment information associated with the individual.

17. The computer-implemented method of claim 16, wherein the employment information comprises the individual's job title.

18. The computer-implemented method of claim 12, wherein the computer-implemented method further comprises:
- determining whether the source is an unwanted automated source attempting to mine the pricing information;
  - at least partially in response to determining that the source is an unwanted automated source, taking one or more defensive actions against the source; and
  - at least partially in response to determining that the source is a wanted automated source, not taking one or more defensive actions against the source.

19. The computer-implemented method of claim 12, wherein the step of determining whether a source of the access is an individual employed by one or more competitors of a company that owns the particular web page being accessed comprises determining whether an IP address associated with the source of access is an IP address associated with the one or more competitors.

20. The computer-implemented method of claim 12, wherein the step of determining whether a source of the access is an individual employed by one or more competitors of a company that owns the particular web page being accessed comprises scanning a post made on one or more public message boards to determine, based at least in part on the content of the post, whether the message board poster is employed by a competitor of a company that owns the particular web page.

21. The computer-implemented method of claim 12, wherein the step of determining whether a source of the access is an individual employed by one or more competitors of a company that owns the particular web page being accessed comprises scanning a review made on one or more public web sites to determine, based at least in part on the content of the review, whether the reviewer is employed by a competitor of a company that owns the particular web page.

22. The non-transitory computer-readable medium of claim 1, wherein the computer-readable medium further stores computer-executable instructions for:
- determining whether the source is an unwanted automated source attempting to mine the pricing information;
- at least partially in response to determining that the source is an unwanted automated source, taking one or more defensive actions against the source; and
- at least partially in response to determining that the source is a wanted automated source, not taking one or more defensive actions against the source.

23. The non-transitory computer-readable medium of claim 2, wherein the computer-readable medium further stores computer-executable instructions for:
- determining whether the source is an unwanted automated source attempting to mine the pricing information;
- at least partially in response to determining that the source is an unwanted automated source, taking one or more defensive actions against the source; and
- at least partially in response to determining that the source is a wanted automated source, not taking one or more defensive actions against the source.

24. The non-transitory computer-readable medium of claim 2, wherein determining whether the source of the access is the individual employed by the one or more competitors, comprises:
- determining that the source of the access is the individual;
- determining at least one identifying piece of data associated with the individual; and
- determining, based at least in part on the at least one identifying piece of data, whether the individual is employed by the one or more competitors.

25. The non-transitory computer-readable medium of claim 4, wherein the computer-readable medium further stores computer-executable instructions for:
- determining whether the source is an unwanted automated source attempting to mine the pricing information;
- at least partially in response to determining that the source is an unwanted automated source, taking one or more defensive actions against the source; and
- at least partially in response to determining that the source is a wanted automated source, not taking one or more defensive actions against the source.

26. The non-transitory computer-readable medium of claim 4, wherein determining whether the source of the access is the individual employed by the one or more competitors, comprises:
- determining that the source of the access is the individual;
- determining at least one identifying piece of data associated with the individual; and
- determining, based at least in part on the at least one identifying piece of data, whether the individual is employed by the one or more competitors.

* * * * *